United States Patent
Zhou et al.

(10) Patent No.: US 10,944,618 B2
(45) Date of Patent: Mar. 9, 2021

(54) APPARATUS AND METHOD FOR CORRECTING DEVIATION BETWEEN PLURALITY OF TRANSMISSION CHANNELS

(71) Applicant: Huawei Technologies Co., Ltd., Shenzhen (CN)

(72) Inventors: Mu Zhou, Shanghai (CN); Ricky Lap Kei Cheung, San Diego, CA (US); Yi Cao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/913,125

(22) Filed: Jun. 26, 2020

(65) Prior Publication Data

US 2020/0328929 A1 Oct. 15, 2020

Related U.S. Application Data

(63) Continuation of application No. PCT/CN2017/119216, filed on Dec. 28, 2017.

(51) Int. Cl.
*H04L 27/38* (2006.01)
*H04L 27/00* (2006.01)
(Continued)

(52) U.S. Cl.
CPC ...... *H04L 27/3854* (2013.01); *H04L 27/0014* (2013.01); *H04L 27/2089* (2013.01); *H04L 27/2695* (2013.01); *H04L 2027/0042* (2013.01)

(58) Field of Classification Search
CPC ............ H04L 27/3854; H04L 27/0014; H04L 27/2089; H04L 27/2695; H04L 2027/0042; H04B 7/04; H04B 17/12; H04B 17/21
See application file for complete search history.

(56) References Cited

U.S. PATENT DOCUMENTS 6,597,730 B1 * 7/2003 Bader ................... H01Q 1/241
375/141
7,496,160 B2 2/2009 Hosokawa
(Continued)

FOREIGN PATENT DOCUMENTS

CN 1725882 A 1/2006
CN 101588198 A 11/2009
(Continued)

*Primary Examiner* — Vineeta S Panwalkar
(74) *Attorney, Agent, or Firm* — Conley Rose, P.C.

(57) ABSTRACT

An apparatus includes a phase offset unit configured to set a phase offset between the first transmission channel and the second transmission channel such that a phase deviation between the first transmission channel and the second transmission channel deviates from zero, a power detection unit configured to detect signal powers of the first transmission channel and the second transmission channel under the phase offset, a processing unit configured to determine, based on the detected signal powers, a deviation correction value between the first transmission channel and the second transmission channel, where the deviation correction value includes a phase correction value, and a phase correction unit configured to set the phase correction value between the first transmission channel and the second transmission channel.

20 Claims, 8 Drawing Sheets

(51) Int. Cl.
*H04L 27/20* (2006.01)
*H04L 27/26* (2006.01)

(56) References Cited

U.S. PATENT DOCUMENTS

| | | | |
|---|---|---|---|
| 7,936,302 B2 * | 5/2011 | Brandwood | H01Q 3/267 |
| | | | 342/174 |
| 8,149,167 B2 * | 4/2012 | Lee | G01S 3/043 |
| | | | 342/420 |
| 2007/0247363 A1 | 10/2007 | Piesinger | |
| 2009/0109085 A1 | 4/2009 | Needham et al. | |
| 2010/0295732 A1 | 11/2010 | Lee et al. | |
| 2010/0311353 A1 | 12/2010 | Teillet et al. | |
| 2015/0270911 A1 | 9/2015 | Nicolson et al. | |

FOREIGN PATENT DOCUMENTS

| | | |
|---|---|---|
| CN | 102460828 A | 5/2012 |
| CN | 104954083 A | 9/2015 |
| CN | 107064887 A | 8/2017 |
| EP | 1098390 A2 | 5/2001 |
| WO | 2016163375 A1 | 10/2016 |

\* cited by examiner (a) AOB (b) AIP (a) Part of a circuit in a chip (b) TRX module of a transmit/receive independent PS (c) TRX module of a transmit/receive shared PS

APPARATUS AND METHOD FOR CORRECTING DEVIATION BETWEEN PLURALITY OF TRANSMISSION CHANNELS

CROSS-REFERENCE TO RELATED APPLICATIONS

This application is a continuation of International Patent Application No. PCT/CN2017/119216, filed on Dec. 28, 2017, the disclosure of which is hereby incorporated by reference in its entirety.

TECHNICAL FIELD

This application relates to the field of communications technologies, and in particular, to an apparatus and a method for correcting a deviation between a plurality of transmission channels.

BACKGROUND

A phased array is a phase-controlled electronic scanned array, and is constituted by arranging a large quantity of antenna units into an array. Each antenna unit may be controlled by an independent switch, and by controlling an amplitude and a phase of each antenna unit in the array, a radiation direction of an electromagnetic wave is modulated, to synthesize a directional scanning-focused beam.

In a fifth generation (5G) communications system, a millimeter wave is used as a carrier of a signal. Because attenuation of the millimeter wave transmitted in the atmosphere is greatly increased compared with that of a low-frequency electromagnetic wave, by introducing a large phased array technology, directionality and equivalent omnidirectional radiation power of the signal in the 5G communications system can be enhanced, and a system communication distance and a system capacity are increased. The large phased array technology uses a large quantity of signal transmission channels integrated in one or more chips. A high-performance phased array requires highly consistent transmission channels. However, in a production and use process, a deviation occurs between these transmission channels, and the deviation between the transmission channels needs to be corrected.

Currently, when the deviation between the transmission channels in the chip is corrected, the chip is usually placed in a loop of a measurement device, reference signals are input into the transmission channels in the chip using the external measurement device, frequency mixing processing is performed on output signals of the transmission channels and the reference signals, and therefore, a phase correction value corresponding to the transmission channels is obtained, and the transmission channels are corrected based on the phase correction value. However, when transmission channel correction is performed using the external measurement device, measurement costs of the transmission channel correction are relatively high, and the transmission channel correction is easily affected by a surrounding electromagnetic environment in a correction process. Consequently, a measurement error is relatively large, and correction accuracy is relatively low.

SUMMARY

Embodiments of this application provide an apparatus and a method for correcting a deviation between a plurality of transmission channels, to reduce a measurement error in a correction process and improve accuracy of deviation correction between the transmission channels.

To achieve the foregoing objective, the following technical solutions are used in the embodiments of this application.

According to a first aspect, an apparatus for correcting a deviation between a plurality of transmission channels is provided. The plurality of transmission channels include a first transmission channel and a second transmission channel, and the apparatus includes a phase offset unit configured to set a phase offset between the first transmission channel and the second transmission channel such that a phase deviation between the first transmission channel and the second transmission channel deviates from zero, a power detection unit configured to detect signal powers of the first transmission channel and the second transmission channel under the phase offset, where the detected signal powers include one or more signal power sets, and each signal power set includes a first signal power detected on the first transmission channel, a second signal power detected on the second transmission channel, and a third signal power detected on the first transmission channel and the second transmission channel, a processing unit configured to determine, based on the detected signal powers, a deviation correction value between the first transmission channel and the second transmission channel, where the deviation correction value includes a phase correction value, and a phase correction unit configured to set the phase correction value between the first transmission channel and the second transmission channel.

In the foregoing technical solution, there is an initial phase deviation between the first transmission channel and the second transmission channel. By setting the phase offset between the first transmission channel and the second transmission channel, the phase offset is superimposed on the initial phase deviation such that the phase deviation between the first transmission channel and the second transmission channel deviates from zero, and signal powers of the first transmission channel and the second transmission channel under the phase offset are detected. When the phase deviation is close to zero, detection errors may be relatively large, and when the phase deviation deviates from zero, the detection errors of the signal powers can be reduced. Therefore, the deviation correction value is determined based on the detected signal powers. The deviation correction value includes the phase correction value, to correct the initial phase deviation, and therefore, accuracy of deviation correction between the transmission channels can be improved.

In a possible implementation of the first aspect, the phase offset includes a plurality of different preset phase offset values, the detected signal powers include a plurality of signal power sets, and each preset phase offset value corresponds to one signal power set. In other words, the phase offset unit is configured to separately set the phase offset between the first transmission channel and the second transmission channel to the plurality of different preset phase offset values, and the power detection unit is configured to detect, each time after the phase offset unit sets a preset phase offset value, signal powers of the first transmission channel and the second transmission channel under the preset phase offset value. In the foregoing possible implementation, different preset phase offset values are set for a plurality of times, and detection is performed for each time of setting, to obtain a plurality of signal power sets. Therefore, when the deviation correction value is determined based on the plurality of signal power sets, a measurement error of the deviation correction value may be further reduced.

In a possible implementation of the first aspect, the phase offset unit and the phase correction unit reuse at least one phase shifter. Optionally, at least one reused phase shifter is disposed on each of the first transmission channel and the second transmission channel, or no reused phase shifter is disposed on the first transmission channel, and at least one reused phase shifter is disposed on the second transmission channel. In the foregoing possible implementation, the phase offset unit and the phase correction unit reuse at least one phase shifter such that utilization of the phase shifter can be improved, costs are reduced, and design flexibility of the apparatus is improved.

In a possible implementation of the first aspect, the phase offset unit and the phase correction unit are not disposed on the first transmission channel, and the phase offset unit and the phase correction unit are disposed on the second transmission channel, or the phase offset unit is disposed on the first transmission channel, and the phase correction unit is disposed on the second transmission channel, or the phase correction unit is disposed on the first transmission channel, and the phase offset unit is disposed on the second transmission channel. The phase offset unit and the phase correction unit may be separately disposed, and do not reuse a phase shifter, and the phase offset unit and the phase correction unit each are at least one independent phase shifter. In the foregoing possible implementation, the phase offset unit and the phase correction unit are separately disposed, and may be disposed on a same transmission channel or different transmission channels such that design flexibility of the apparatus can be improved.

In a possible implementation of the first aspect, both the first transmission channel and the second transmission channel are transmit channels, and the power detection unit is connected to the first transmission channel and the second transmission channel by respectively using a first coupler and a second coupler, to receive a signal coupled from the first transmission channel and/or the second transmission channel. In the foregoing possible implementation, when both the first transmission channel and the second transmission channel are transmit channels, the power detection unit may detect the signal powers of the first transmission channel and the second transmission channel using the first coupler and the second coupler, and it is ensured that errors of the detected signal powers are relatively small.

In a possible implementation of the first aspect, both the first transmission channel and the second transmission channel are receive channels, signals of the first transmission channel and the second transmission channel are combined using a combiner, and the power detection unit is connected to the combiner using a coupler, to receive the signals coupled from the combiner. Optionally, the combiner may be integrated into the power detection unit, and signals received by the first transmission channel and the second transmission channel may be transmitted using a far field, or transmitted using a reference channel. In the foregoing possible implementation, when both the first transmission channel and the second transmission channel are receive channels, the power detection unit may detect the signal powers of the first transmission channel and the second transmission channel using the coupler and the combiner, and it is ensured that errors of the detected signal powers are relatively small.

In a possible implementation of the first aspect, both the first transmission channel and the second transmission channel are transmit channels, signals transmitted by the first transmission channel and the second transmission channel are looped back to a receive channel through an air interface, and the power detection unit is connected to the receive channel using a coupler, to receive the signals coupled from the receive channel. In the foregoing possible implementation, when both the first transmission channel and the second transmission channel are transmit channels, the power detection unit may detect a power of the signals looped back from the first transmission channel and the second transmission channel to the receive channel through the air interface such that utilization of the transmission channels in the apparatus can be improved to some extent, a problem that it is not easy to implement the solution when a physical distance between the first transmission channel and the second transmission channel is relatively long is avoided, and complexity of the apparatus is reduced.

In a possible implementation of the first aspect, the deviation correction value further includes an amplitude correction value, and the phase correction unit is further configured to set the amplitude correction value between the first transmission channel and the second transmission channel. In the foregoing possible implementation, an amplitude deviation between the first transmission channel and the second transmission channel can be further corrected, to further improve accuracy of transmission channel correction.

In a possible implementation of the first aspect, the plurality of transmission channels further include a third transmission channel, and the apparatus is further configured to correct a deviation between the first transmission channel and the third transmission channel, and/or correct a deviation between the second transmission channel and the third transmission channel. That the apparatus is further configured to correct the deviation between the first transmission channel and the third transmission channel is used as an example. Therefore, the phase offset unit is further configured to set a phase offset between the first transmission channel and the third transmission channel such that a phase deviation between the first transmission channel and the third transmission channel deviates from zero, the power detection unit is further configured to detect signal powers of the first transmission channel and the third transmission channel under the phase offset, where the detected signal powers include one or more signal power sets, the processing unit is further configured to determine, based on the detected signal powers of the first transmission channel and the third transmission channel, a deviation correction value between the first transmission channel and the third transmission channel, and the phase correction unit is further configured to set the deviation correction value between the first transmission channel and the third transmission channel. In the foregoing possible implementation, deviation correction may be implemented between any two transmission channels in the plurality of transmission channels, and accuracy of deviation correction between the plurality of transmission channels is improved.

In a possible implementation of the first aspect, the processing unit is further configured to determine an absolute deviation correction value of each transmission channel based on the deviation correction value between the first transmission channel and the second transmission channel, the deviation correction value between the first transmission channel and the third transmission channel, and a deviation correction value between the second transmission channel and the third transmission channel, and the correction unit is further configured to perform transmission channel correction based on the absolute deviation correction value of each transmission channel. In the foregoing possible implementation, the apparatus may further determine the absolute deviation correction value of each transmission channel based on a deviation correction value between any two of the plurality of transmission channels such that a problem, caused by superimposition of measurement errors, that a correction error between a transmission channel on which superimposition is performed for a relatively large quantity of times and a reference transmission channel for correction is relatively large may be avoided, and accuracy of deviation correction between the plurality of transmission channels is further improved.

In a possible implementation of the first aspect, the apparatus may be integrated into a semiconductor chip, the plurality of transmission channels may also be integrated into a semiconductor chip, and the apparatus and the plurality of transmission channels may be integrated into a same semiconductor chip, or may be integrated into different semiconductor chips.

According to a second aspect, a wireless communications device is provided. The wireless communications device includes the apparatus provided in any one of the first aspect or the possible implementations of the first aspect. Optionally, the device may be a base station, a terminal, or a semiconductor chip.

According to a third aspect, a method for correcting a deviation between a plurality of transmission channels is provided. The plurality of transmission channels include a first transmission channel and a second transmission channel, and the method includes setting a phase offset between the first transmission channel and the second transmission channel such that a phase deviation between the first transmission channel and the second transmission channel deviates from zero, detecting signal powers of the first transmission channel and the second transmission channel under the phase offset, where the detected signal powers include one or more signal power sets, and each signal power set includes a first signal power detected on the first transmission channel, a second signal power detected on the second transmission channel, and a third signal power detected on the first transmission channel and the second transmission channel, determining, based on the detected signal powers, a deviation correction value between the first transmission channel and the second transmission channel, where the deviation correction value includes a phase correction value, and setting the phase correction value between the first transmission channel and the second transmission channel.

In a possible implementation of the third aspect, the phase offset includes a plurality of different preset phase offset values, the detected signal powers include a plurality of signal power sets, and each preset phase offset value corresponds to one signal power set. In other words, the phase offset between the first transmission channel and the second transmission channel is separately set to the plurality of different preset phase offset values, and each time after a preset phase offset value is set, signal powers of the first transmission channel and the second transmission channel under the preset phase offset value is detected.

In a possible implementation of the third aspect, the deviation correction value further includes an amplitude correction value, and the method further includes setting the amplitude correction value between the first transmission channel and the second transmission channel.

In a possible implementation of the third aspect, the plurality of transmission channels further include a third transmission channel, and the method further includes correcting a deviation between the first transmission channel and the third transmission channel, and/or correcting a deviation between the second transmission channel and the third transmission channel.

The method provided in any one of the second aspect or the possible implementations of the second aspect may be performed by the apparatus or the chip provided in any one of the first aspect or the possible implementations of the first aspect, or may be performed by the wireless channel device provided in the second aspect.

It may be understood that any apparatus for correcting a deviation between a plurality of transmission channels that is provided above is configured to perform the method for correcting a deviation between a plurality of transmission channels that is provided above. Therefore, for beneficial effects that can be achieved by the method, refer to beneficial effects in the corresponding apparatus provided above. Details are not described herein again.

DESCRIPTION OF EMBODIMENTS

A phased array is a phase-controlled electronic scanned array, and is constituted by arranging a large quantity of antenna units into an array. Each antenna unit may be controlled by an independent switch, and by controlling an amplitude and a phase of each antenna unit in the array, a radiation direction of an electromagnetic wave is modulated, to synthesize a directional scanning-focused beam. A device (for example, a base station or a terminal) in a communications system that uses a phased array technology may include an antenna unit and a chip. One chip may include a plurality of radio frequency channels, and one channel, in the device, used for receiving or transmitting a signal may include one radio frequency channel and one antenna unit. In embodiments of this application, the radio frequency channel, and the channel including the radio frequency channel and the antenna unit each may be referred to as a transmission channel.

Figure 1:
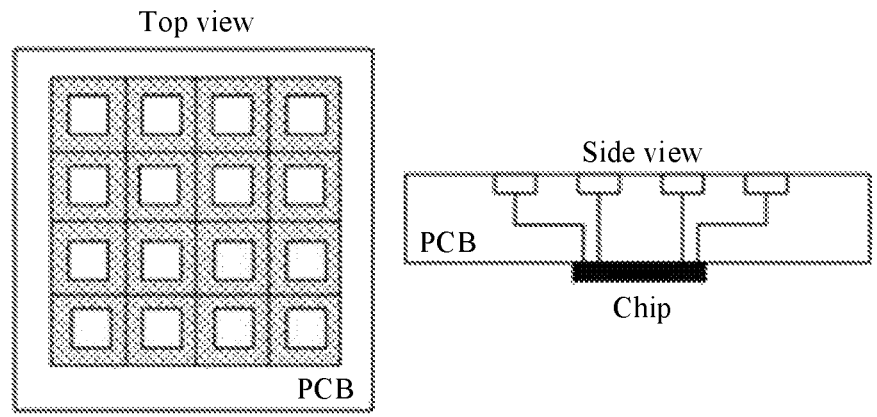
FIG. 1 is a schematic structural diagram of a combination form of an antenna unit and a chip according to an embodiment of this application.
Figure 1:
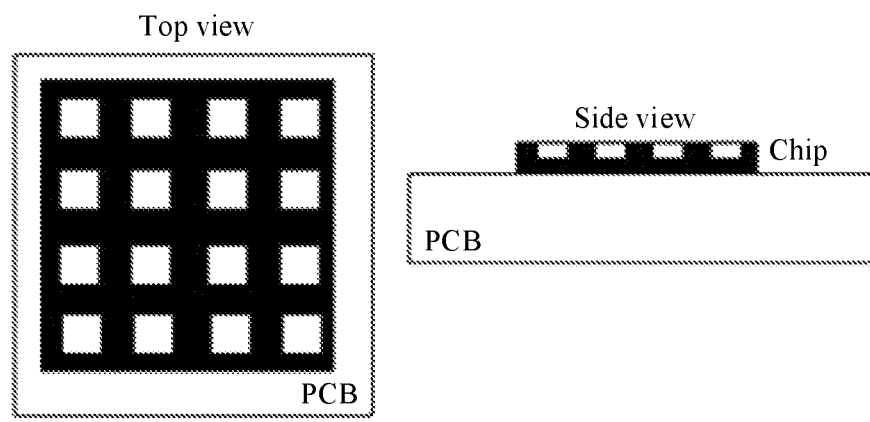

As shown in FIG. 1, that an antenna unit is a patch antenna and a phased array includes a 4×4 antenna array is used as an example. During print design, the antenna unit and a chip in the phased array may be combined in two forms an antenna on board (AOB) and an antenna in package (AIP). As shown in (a) in FIG. 1, the AOB refers to an antenna unit on a printed circuit board (PCB), and the antenna unit and a chip may be separately located on two surfaces of the PCB (in other words, the antenna unit is printed on one surface of the PCB, and the chip is attached to the other surface of the PCB). Alternatively, the antenna unit and the chip may be located on a same surface of the PCB (in other words, the antenna unit is printed on a surface of the PCB, and the chip is also attached to the surface). In FIG. 1, an example in which the antenna unit and the chip are located on different surfaces is used for description. As shown in (b) in FIG. 1, the AIP refers to an antenna unit located in a package of a chip, the antenna unit is packaged with the chip, the antenna unit may be located on the top of the package of the chip, and the chip is attached to a PCB.

Figure 2:
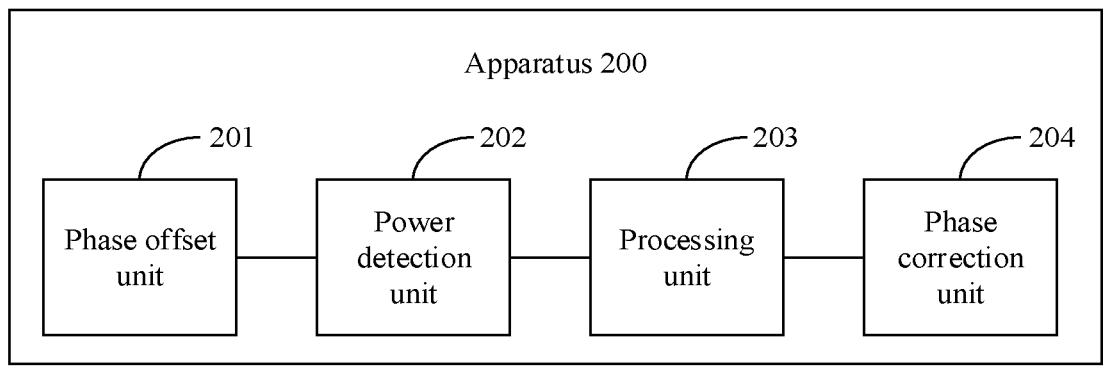
FIG. 2 is a schematic structural diagram of a first apparatus according to an embodiment of this application.

FIG. 2 is a schematic structural diagram of an apparatus for correcting a deviation between a plurality of transmission channels according to an embodiment of this application. The plurality of transmission channels include a first transmission channel and a second transmission channel. The apparatus 200 includes a phase offset unit 201, a power detection unit 202, a processing unit 203, and a phase correction unit 204.

The phase offset unit 201 is configured to set a phase offset between the first transmission channel and the second transmission channel such that a phase deviation between the first transmission channel and the second transmission channel deviates from zero.

The plurality of transmission channels may be a plurality of transmission channels in one chip, and the first transmission channel and the second transmission channel may be any two of the plurality of transmission channels. For example, the first transmission channel and the second transmission channel may be two transmission channels with adjacent physical positions, or may be two transmission channels whose physical positions are far away from each other. The first transmission channel and the second transmission channel may be to-be-corrected transmit channels, or may be to-be-corrected receive channels.

In addition, when the phase offset unit 201 is configured to set the phase offset between the first transmission channel and the second transmission channel, the phase offset unit 201 may be configured to set a phase offset value of the first transmission channel, or configured to set a phase offset value of the second transmission channel, or configured to set a phase offset value of each of the first transmission channel and the second transmission channel, to implement a function of setting the phase offset between the first transmission channel and the second transmission channel.

There is an initial phase deviation between the first transmission channel and the second transmission channel, and the initial phase deviation is a deviation that needs to be measured and corrected. When the initial phase deviation between the first transmission channel and the second transmission channel is close to zero, an error of measuring the initial phase difference using a signal power detection method is relatively large. The phase offset unit 201 sets the phase offset between the first transmission channel and the second transmission channel, and after the phase offset is superimposed on the initial phase deviation, the phase deviation between the first transmission channel and the second transmission channel may deviate from zero such that measurement precision of the initial phase difference is improved.

The power detection unit 202 is configured to detect signal powers of the first transmission channel and the second transmission channel under the phase offset. The detected signal powers include one or more signal power sets, and each signal power set includes a first signal power detected on the first transmission channel, a second signal power detected on the second transmission channel, and a third signal power detected on the first transmission channel and the second transmission channel.

The power detection unit 202 may separately perform one time of signal power detection on the first transmission channel, on the second transmission channel, and on the first transmission channel and the second transmission channel, to obtain one signal power set. Alternatively, the power detection unit 202 separately performs a plurality of times of signal power detection on the first transmission channel, on the second transmission channel, and on the first transmission channel and the second transmission channel, to obtain a plurality of signal power sets.

In addition, when the first transmission channel is opened and the second transmission channel is closed, the power detection unit 202 may detect the first transmission channel, to obtain the first signal power, when the first transmission channel is closed and the second transmission channel is opened, the power detection unit 202 may detect the second transmission channel, to obtain the second signal power, and when both the first transmission channel and the second transmission channel are opened, the power detection unit 202 may detect the first transmission channel and the second transmission channel, to obtain the third signal power. Therefore, the signal powers under the phase deviation are obtained.

The processing unit 203 is configured to determine, based on the detected signal powers, a deviation correction value between the first transmission channel and the second transmission channel. The deviation correction value includes a phase correction value.

When the detected signal powers include one signal power set, the processing unit 203 may be configured to determine, based on the signal power set, the deviation correction value between the first transmission channel and the second transmission channel. When the detected signal powers include a plurality of signal power sets, the processing unit 203 may be configured to determine, based on the plurality of signal power sets, the deviation correction value between the first transmission channel and the second transmission channel.

Figure 3:
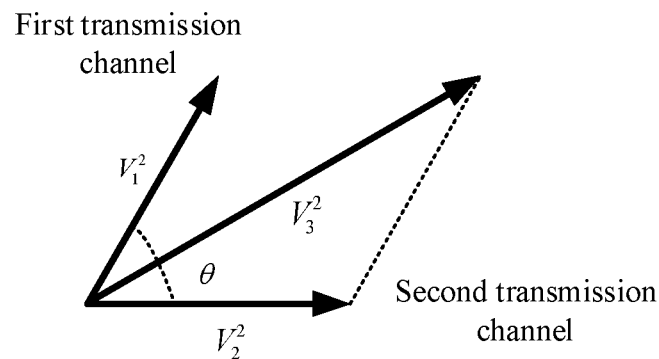
FIG. 3 is an example diagram of a deviation between transmission channels according to an embodiment of this application.

Each signal power set includes the first signal power, the second signal power, and the third signal power. For ease of understanding, one signal power set is used as an example for description herein. As shown in FIG. 3, it is assumed that the first signal power is $V_1^2$, the second signal power is $V_2^2$, the third signal power is $V_3^2$, the phase deviation between the first transmission channel and the second transmission channel includes a phase correction value $\theta_0$ (namely, the initial phase deviation obtained through measurement), an included angle between a signal of the first transmission channel and a signal of the second transmission channel is $\theta$ (which may also be referred to as a phase deviation estimation value), and the phase deviation estimation value $\theta$ is superimposition of the initial phase deviation and the set phase offset $\phi$. Therefore, the processing unit 203 may determine the phase deviation estimation value $\theta$ based on the following formula (1), and the phase correction value $\theta_0$ is determined based on a difference between $\theta$ and $\phi$, where $$\theta = a\cos\frac{V_3^2 - (V_1^2 + V_2^2)}{2V_1V_2}. \tag{1}$$

For example, if it is assumed that the initial phase deviation $\theta_0=5°$, and the set phase offset between the first transmission channel and the second transmission channel $\phi=45°$ the phase deviation estimation value $\theta$ determined based on the formula (1) may be 50 degrees, and the phase correction value $\theta_0=5°$ may be obtained by subtracting 45 degrees from 50 degrees. Herein, an example in which the phase correction value $\theta_0$ obtained through measurement is equal to the initial phase deviation is used for description.

When the detected signal powers include a plurality of signal power sets, the processing unit 203 may be configured to determine one phase correction value based on each signal power set, and then determine that an average value of a plurality of obtained phase correction values is the phase correction value between the first transmission channel and the second transmission channel, or determine the final phase correction value based on another statistical method. This is not specifically limited in this embodiment of this application.

The phase correction unit 204 is configured to set the phase correction value between the first transmission channel and the second transmission channel.

When the phase correction unit 204 is configured to set the phase correction value between the first transmission channel and the second transmission channel, the first transmission channel may be compensated with the phase correction value, or the second transmission channel may be compensated with the phase correction value, to implement a function of setting the phase correction value between the first transmission channel and the second transmission channel.

In addition, there is the initial phase difference between the first transmission channel and the second transmission channel. After the phase correction value between the first transmission channel and the second transmission channel is determined, the phase correction unit 204 is configured to set the phase correction value between the first transmission channel and the second transmission channel, to correct the initial phase deviation between the first transmission channel and the second transmission channel such that consistency between the first transmission channel and the second transmission channel can be ensured.

Specifically, when the phase offset between the first transmission channel and the second transmission channel that is set by the phase offset unit 201 is not restored to zero during correction, the phase correction unit 204 may correct the first transmission channel or the second transmission channel based on the phase correction value and the phase offset, to ensure consistency between the first transmission channel and the second transmission channel. When the phase offset between the first transmission channel and the second transmission channel that is set by the phase offset unit 201 is restored to zero during correction, the phase correction unit 204 may correct the first transmission channel or the second transmission channel based on the phase correction value, to ensure consistency between the first transmission channel and the second transmission channel.

For example, the phase correction value is 6 degrees, the phase offset is 40 degrees, and if the phase offset 40 degrees is not restored to zero during correction, the phase correction unit 204 may compensate the first transmission channel with 46 degrees (a sum of the phase correction value 6 degrees and the phase offset 40 degrees), or the phase correction unit 204 may compensate the second transmission channel with −46 degrees. If the phase offset 40 degrees is restored to zero during correction, the phase correction unit 204 may compensate the first transmission channel with 6 degrees, or compensate the second transmission channel with −6 degrees.

Further, when the deviation correction value further includes an amplitude correction value, the processing unit 203 is further configured to determine, based on the detected signal powers, the amplitude correction value between the first transmission channel and the second transmission channel, and the phase correction unit 204 is further configured to set the amplitude correction value between the first transmission channel and the second transmission channel.

For ease of understanding, one signal power set is used as an example for description herein. It is assumed that the first signal power is $V_1^2$, the second signal power is $V_2^2$, and the phase deviation between the first transmission channel and the second transmission channel further includes the amplitude correction value P, in other words, an amplitude difference between a signal of the first transmission channel and a signal of the second transmission channel is P. Therefore, the processing unit 203 may determine the amplitude correction value P based on the following formula (2), where $$P = 10\log V_2^2 - 10\log V_1^2 \tag{2}.$$

In addition, when the phase correction unit 204 sets the amplitude correction value between the first transmission channel and the second transmission channel, the first transmission channel may be compensated with the amplitude correction value, or the second transmission channel may be compensated with the amplitude correction value, to implement a function of setting the amplitude correction value between the first transmission channel and the second transmission channel.

In this embodiment of this application, the phase offset between the first transmission channel and the second transmission channel is set such that the phase deviation between the first transmission channel and the second transmission channel deviates from zero. Therefore, when the signal powers of the first transmission channel and the second transmission channel are detected, detection errors of the signal powers can be reduced, and when the deviation correction value is determined based on the signal powers and phase deviation correction and amplitude deviation correction are performed, measurement errors of the phase correction value and the amplitude correction value can be reduced, and accuracy of channel correction is improved.

Further, the phase offset includes a plurality of different preset phase offset values, the detected signal powers include a plurality of signal power sets, and each preset phase offset value corresponds to one signal power set. It should be understood that, in this embodiment of this application, by setting the phase offset, the phase deviation between the two to-be-corrected transmission channels deviates from zero. However, it is not excluded that because of randomness of an initial phase deviation, in some cases, the phase deviation, on which the phase offset is superimposed, between the two transmission channels may still be close to zero. In this optional implementation, the plurality of different preset phase offset values are used, to help further improve accuracy and reliability of correcting the initial phase deviation.

Specifically, the phase offset unit 201 may be configured to separately set a phase offset between the first transmission channel and the second transmission channel for a plurality of times, and the phase offset set each time may be one of the plurality of different preset phase offset values. Correspondingly, each time after the phase offset unit 201 sets a phase offset between the first transmission channel and the second transmission channel, the power detection unit 202 may detect signal powers of the first transmission channel and the second transmission channel under the currently set phase offset, to obtain one signal power set. Therefore, after the phase offset unit 201 separately sets the plurality of different preset phase offset values, the power detection unit 202 may obtain a plurality of signal power sets through detection, and one preset phase offset value corresponds to one signal power set.

Further, the phase offset unit 201 and the phase correction unit 204 may reuse at least one phase shifter. In other words, functions of the phase offset unit 201 and the phase correction unit 204 may be implemented by at least one phase shifter. The at least one phase shifter may not only be configured to set the phase offset between the first transmission channel and the second transmission channel, but also be configured to set the deviation correction value between the first transmission channel and the second transmission channel.

Specifically, when the phase offset unit 201 and the phase correction unit 204 reuse at least one phase shifter, disposition of the phase shifter on the first transmission channel and the second transmission channel may include the following several cases, and the cases are specifically described as follows.

Case 1. At least one reused phase shifter is disposed on each of the first transmission channel and the second transmission channel, in other words, one or more phase shifters are disposed on each of the first transmission channel and the second transmission channel.

One or more phase shifters may be disposed on the first transmission channel, and when one phase shifter is disposed on the first transmission channel, the phase shifter may be configured to set a phase offset value of the first transmission channel, or may be configured to set a deviation correction value of the first transmission channel, or when a plurality of phase shifters are disposed on the first transmission channel, the plurality of phase shifters may be cooperatively configured to set a phase offset value of the first transmission channel, or may be cooperatively configured to set a deviation correction value of the first transmission channel. Similarly, one or more phase shifters may be disposed on the second transmission channel. Descriptions of the one or more phase shifters on the second transmission channel are consistent with related descriptions of the one or more phase shifters on the first transmission channel. Details are not described herein again in this embodiment of this application.

Correspondingly, when at least one reused phase shifter is disposed on each of the first transmission channel and the second transmission channel, the reused phase shifter on the first transmission channel may be configured to set a phase offset value of the first transmission channel, and the reused phase shifter on the second transmission channel may also be configured to set a phase offset value of the second transmission channel. Therefore, when the phase offset between the first transmission channel and the second transmission channel is set, a difference between the set phase offset values of the two transmission channels is the phase offset. For example, a phase offset value of the first transmission channel is set to 20 degrees using the reused phase shifter on the first transmission channel, and a phase offset value of the second transmission channel is set to 110 degrees using the reused phase shifter on the second transmission channel such that the phase offset between the first transmission channel and the second transmission channel is 90 degrees.

When the phase offset between the first transmission channel and the second transmission channel includes a plurality of different preset phase offset values, during each time of setting, one phase offset value may be set for the first transmission channel using the reused phase shifter on the first transmission channel, and another phase offset value is set for the second transmission channel using the reused phase shifter on the second transmission channel. After each time of setting, the phase offset between the first transmission channel and the second transmission channel is a different preset phase offset value.

For example, in one time of setting, a phase offset value of the first transmission channel is set to 120 degrees, and a phase offset value of the second transmission channel is set to 60 degrees such that the phase offset between the first transmission channel and the second transmission channel is −60 degrees. In another time of setting, a phase offset value of the first transmission channel is set to 45 degrees, and a phase offset value of the second transmission channel is set to −40 degrees such that the phase offset between the first transmission channel and the second transmission channel is 5 degrees. In this case, if an initial phase deviation between the first transmission channel and the second transmission channel is 57 degrees, after the first time of setting, a phase deviation between the first transmission channel and the second transmission channel is 3 degrees, and the phase deviation is close to zero. Then after the second time of setting, a phase deviation between the first transmission channel and the second transmission channel is 62 degrees, and a plurality of different preset phase offset values are set for a plurality of times such that the phase deviation between the first transmission channel and the second transmission channel deviates from zero.

Optionally, the phase offset between the first transmission channel and the second transmission channel may alternatively be a specified offset value. When the specified offset value remains unchanged, angle offset values of the first transmission channel are separately set for a plurality of times using the reused phase shifter on the first transmission channel, and angle offset values of the second transmission channel are separately set for a plurality of times using the reused phase shifter on the second transmission channel.

For example, the specified offset value is 90 degrees. In one time of setting, a phase offset value of the first transmission channel is set to 60 degrees, and a phase offset value of the second transmission channel is set to 150 degrees such that the phase offset between the first transmission channel and the second transmission channel is 90 degrees. In another time of setting, a phase offset value of the first transmission channel is set to −45 degrees, and a phase offset value of the second transmission channel is set to 45 degrees such that the phase offset between the first transmission channel and the second transmission channel is 90 degrees.

Case 2. No phase shifter is disposed on the first transmission channel, and at least one reused phase shifter is disposed on the second transmission channel.

The first transmission channel may be used as a reference transmission channel, and no phase shifter is used on the first transmission channel. At least one or more phase shifters are disposed on the second transmission channel. The one or more phase shifters may be configured to set a phase offset value of the second transmission channel, to implement a function of setting the phase offset between the first transmission channel and the second transmission channel. The one or more phase shifters may alternatively be configured to set a deviation correction value of the second transmission channel, to implement a function of setting the deviation correction value between the first transmission channel and the second transmission channel.

Further, the phase offset unit 201 and the phase correction unit 204 may alternatively be disposed separately, and at least two phase shifters are included. For example, the phase offset unit 201 is the first phase shifter, the phase correction unit 204 is the second phase shifter, the first phase shifter is configured to implement a function of the phase offset unit 201, and the second phase shifter is configured to implement a function of the phase correction unit 204.

Specifically, disposition of two phase shifters on the first transmission channel and the second transmission channel may include the following several cases two phase shifters are disposed on each of the first transmission channel and the second transmission channel, or the first phase shifter is disposed on the first transmission channel, and the second phase shifter is disposed on the second transmission channel, or the second phase shifter is disposed on the first transmission channel, and the first phase shifter is disposed on the second transmission channel, or no phase shifter is disposed on the first transmission channel, and two phase shifter are disposed on the second transmission channel.

Further, when the phase offset unit 201 and the phase correction unit 204 reuse at least one phase shifter, or when the phase offset unit 201 and the phase correction unit 204 are separately disposed and are at least two phase shifters, a phase shifter configured to implement a function of the phase correction unit 204, when correcting the deviation between the first transmission channel and the second transmission channel, may query for, based on a preset phase shifter constellation diagram and the deviation correction value determined by the processing unit 203, input codewords corresponding to an in-phase (I) input and a quadrature (Q) input of a phase shifter disposed on each transmission channel, and set the I input and/or the Q input of the phase shifter of each transmission channel based on the corresponding input codewords, to implement phase correction and/or amplitude correction.

Figure 4:
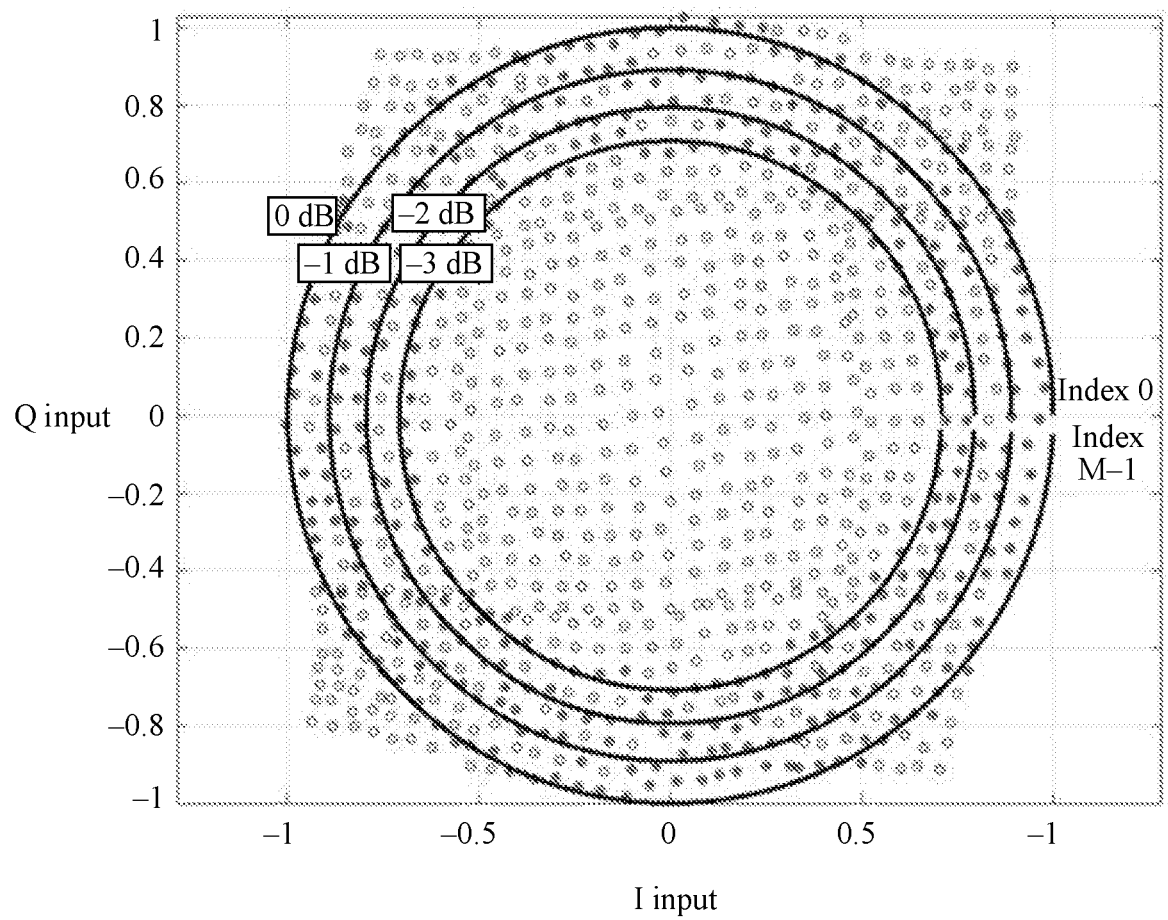
FIG. 4 is a schematic diagram of a phase shifter constellation diagram according to an embodiment of this application.

FIG. 4 is a schematic diagram of a phase shifter constellation diagram. The horizontal coordinate is a preset input codeword of an I input of a phase shifter, and the vertical coordinate is a preset input codeword of a Q input of the phase shifter. A circular curve in the figure is an amplitude-phase circle, a direction from an index 0 to an index M−1 represents a phase (for example, represents 0 degrees to 360 degrees), and each circular curve corresponds to a different amplitude. For example, that the set phase offset between the first transmission channel and the second transmission channel is restored to zero, and a phase correction value is set on the second transmission channel is used as an example. A specific process of setting the phase correction value and the amplitude correction value between the first transmission channel and the second transmission channel may be as follows. It is assumed that the phase correction value is 90 degrees such that it starts from the index 0 and rotates 90 degrees in a direction from the index 0 to the index M−1, to obtain that a corresponding I input at 90 degrees is 0, and if the amplitude correction value is −2 decibels (dB), an amplitude-phase circle corresponding to −2 dB is a third circle, and a corresponding Q input is 0.8. Therefore, it is determined that an input codeword corresponding to a phase shifter on the second transmission channel is (0, 0.8).

Figure 5:
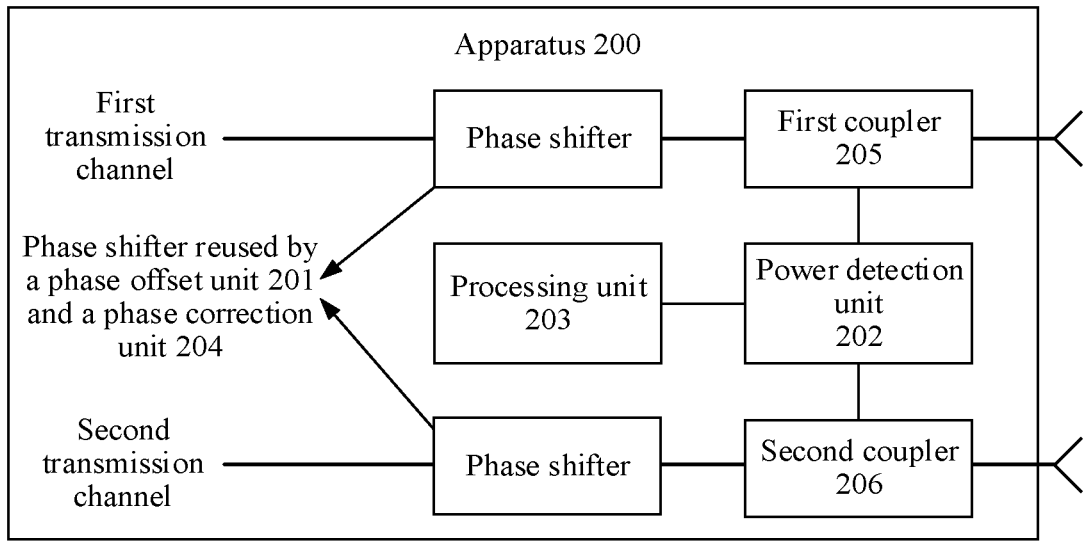
FIG. 5 is a schematic structural diagram of a second apparatus according to an embodiment of this application.

Further, referring to FIG. 5, when both the first transmission channel and the second transmission channel are transmit channels, the power detection unit 202 is connected to the first transmission channel and the second transmission channel by respectively using a first coupler 205 and a second coupler 206, to receive a signal coupled from the first transmission channel and/or the second transmission channel. In FIG. 5, an example in which the phase offset unit 201 and the phase correction unit 204 reuse at least one phase shifter, and one reused phase shifter is disposed on each transmission channel is used for description.

Specifically, both the first transmission channel and the second transmission channel are used to transmit reference signals, and the reference signals may be input into the first transmission channel and the second transmission channel using a reference channel. When the first transmission channel is opened and the second transmission channel is closed, a reference signal transmitted using the first transmission channel is coupled and output from the first coupler 205, and the power detection unit 202 is configured to detect a power of the signal coupled from the first coupler 205, to obtain a first signal power. When the first transmission channel is closed and the second transmission channel is opened, a reference signal transmitted by the second transmission channel is coupled and output from the second coupler 206, and the power detection unit 202 is configured to detect a power of the signal coupled from the second coupler 206, to obtain a second signal power. When both the first transmission channel and the second transmission channel are opened, a reference signal transmitted by the first transmission channel is coupled and output from the first coupler 205, a reference signal transmitted by the second transmission channel is coupled and output from the second coupler 206, and the power detection unit 202 is configured to detect a power of the signals coupled from the first coupler 205 and the second coupler 206, to obtain a third signal power.

Figure 6:
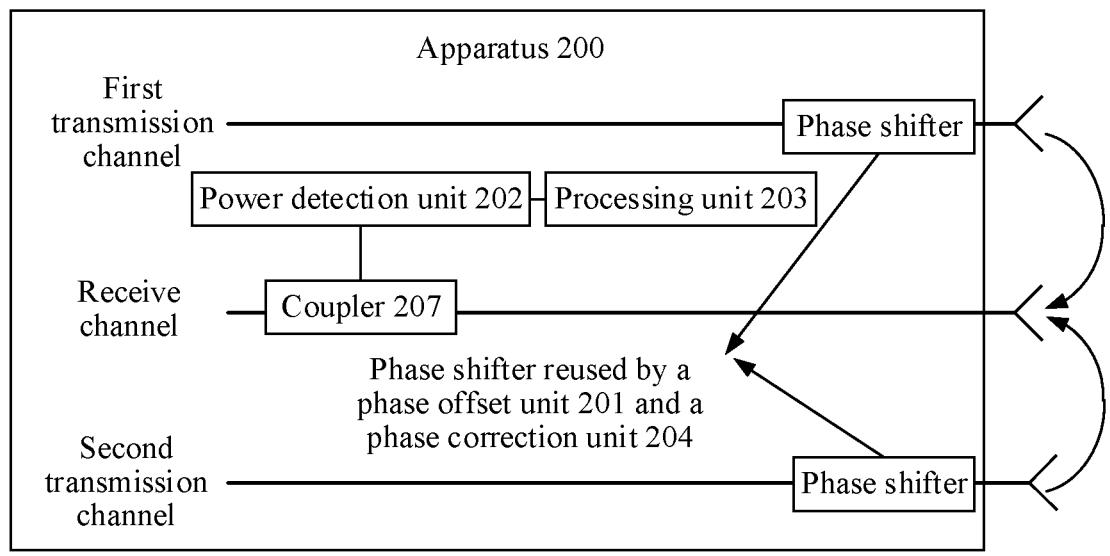
FIG. 6 is a schematic structural diagram of a third apparatus according to an embodiment of this application.

Alternatively, as shown in FIG. 6, when both the first transmission channel and the second transmission channel are transmit channels, signals transmitted by the first transmission channel and the second transmission channel are looped back to a receive channel through an air interface, and the power detection unit 202 is connected to the receive channel using a coupler 207, to receive the signals coupled from the receive channel. In FIG. 6, an example in which the phase offset unit 201 and the phase correction unit 204 reuse at least one phase shifter, and one reused phase shifter is disposed on each transmission channel is used for description.

Specifically, both the first transmission channel and the second transmission channel are used to transmit reference signals. The reference signals may be externally input into the first transmission channel and the second transmission channel. Alternatively, a specific transmission channel in the plurality of transmission channels is used as a receive channel, and reference signals received by the receive channel are input into the first transmission channel and the second transmission channel. When the first transmission channel is opened and the second transmission channel is closed, a reference signal transmitted by the first transmission channel is looped back to the receive channel through the air interface, the signal received by the receive channel is coupled and output from the coupler 207, and the power detection unit 202 is configured to detect a power of the signal coupled from the coupler 207, to obtain a first signal power. When the first transmission channel is closed and the second transmission channel is opened, a reference signal transmitted by the second transmission channel is looped back to the receive channel through the air interface, the signal received by the receive channel is coupled and output from the coupler 207, and the power detection unit 202 is configured to detect a power of the signal coupled from the coupler 207, to obtain a second signal power. When both the first transmission channel and the second transmission channel are opened, reference signals transmitted by the first transmission channel and the second transmission channel are looped back to the receive channel through the air interface, the signals received by the receive channel are coupled and output from the coupler 207, and the power detection unit 202 is configured to detect a power of the signals coupled from the coupler 207, to obtain a third signal power.

Figure 7:
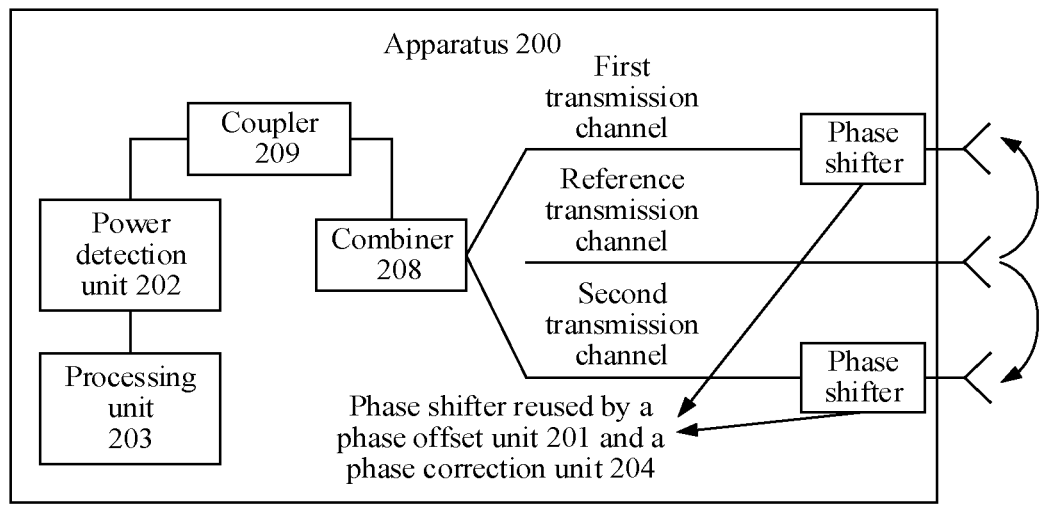
FIG. 7 is a schematic structural diagram of a fourth apparatus according to an embodiment of this application.
Figure 8:
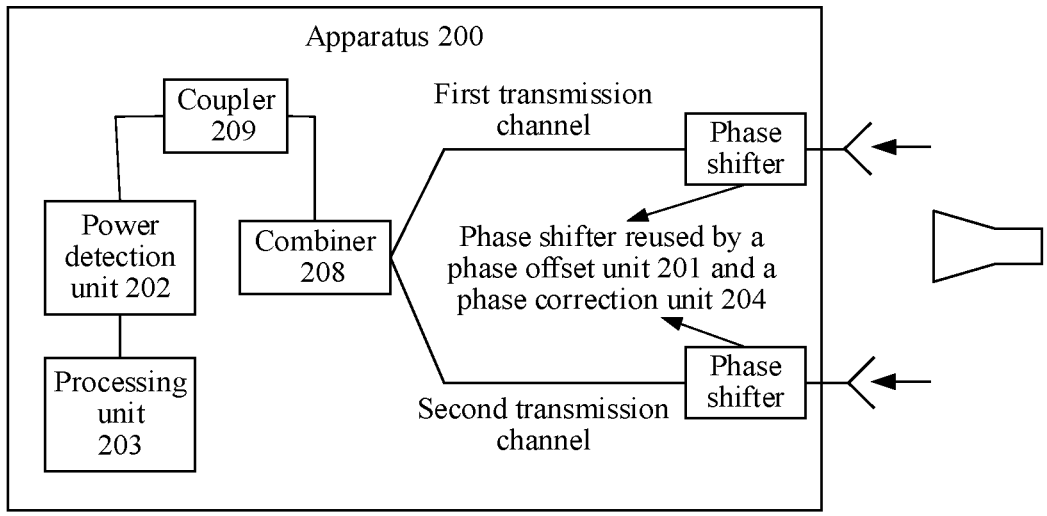
FIG. 8 is a schematic structural diagram of a fifth apparatus according to an embodiment of this application.

Further, as shown in FIG. 7 or FIG. 8, both the first transmission channel and the second transmission channel are receive channels, signals of the first transmission channel and the second transmission channel are combined using a combiner 208, and the power detection unit 202 is connected to the combiner 208 using a coupler 209, to receive the signals coupled from the combiner 208. Optionally, a function of the combiner 208 may alternatively be integrated into the power detection unit 202.

Both the first transmission channel and the second transmission channel are receive channels, and are configured to receive reference signals. As shown in FIG. 7, reference signals received by the first transmission channel and the second transmission channel may be transmitted using a reference channel. Alternatively, as shown in FIG. 8, reference signals received by the first transmission channel and the second transmission channel are transmitted by a far field, for example, transmitted by an external component or device. In FIG. 7 and FIG. 8, an example in which the phase offset unit 201 and the phase correction unit 204 reuse at least one phase shifter, and one reused phase shifter is disposed on each transmission channel is used for description.

Specifically, when the first transmission channel is opened and the second transmission channel is closed, a reference signal received by the first transmission channel passes the combiner 208 and is coupled and output from the coupler 209, and the power detection unit 202 is configured to detect a power of the signal coupled from the coupler 209, to obtain a first signal power. When the first transmission channel is closed and the second transmission channel is opened, a reference signal received by the second transmission channel passes the combiner 208 and is coupled and output from the coupler 209, and the power detection unit 202 is configured to detect a power of the signal coupled from the coupler 209, to obtain a second signal power. When both the first transmission channel and the second transmission channel are opened, reference signals received by the first transmission channel and the second transmission channel are combined by the combiner 208 and then are coupled and output from the coupler 209, and the power detection unit 202 is configured to detect a power of the signals coupled from the coupler 209, to obtain a third signal power.

Figure 9:
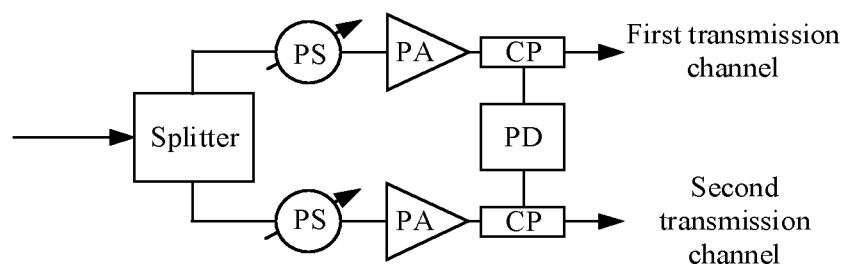
FIG. 9 is a schematic structural diagram of a part of a first apparatus according to an embodiment of this application.
Figure 10:
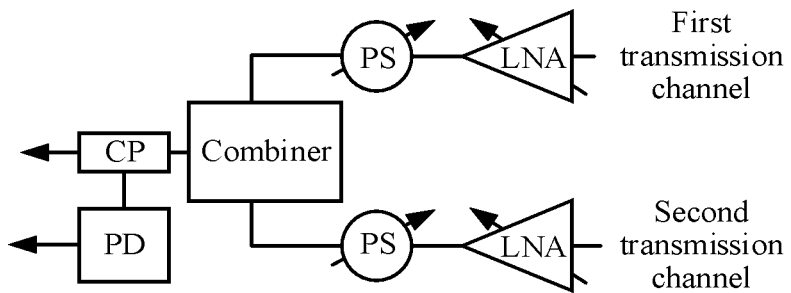
FIG. 10 is a schematic structural diagram of a part of a second apparatus according to an embodiment of this application.

For example, FIG. 9 and FIG. 10 are schematic diagrams of a part of a structure of the apparatus 200 according to embodiments of this application. In FIG. 9, an example in which both the first transmission channel and the second transmission channel are transmit channels is used. In FIG. 10, an example in which both the first transmission channel and the second transmission channel are receive channels is used. FIG. 9 and FIG. 10 are described using an example in which the power detection unit 202 includes a power detector (PD), and the PD is connected to the transmission channel using a coupler.

In FIG. 9, the first transmission channel and the second transmission channel are two transmit channels obtained through splitting by a channel splitter, one reused phase shifter phase shifter and a power amplifier are disposed on each transmission channel, the power amplifier is configured to perform power amplification on a signal, and the first transmission channel and the second transmission channel are separately coupled to the PD using a coupler. In FIG. 10, after being combined by a combiner, the first transmission channel and the second transmission channel are coupled to a PD using a coupler, and one low noise amplifier (LNA) may be disposed on each transmission channel. The PD in FIG. 9 or FIG. 10 may be a digital PD, or may be an analog PD. When the PD is the analog PD, an analog-to-digital converter (ADC) may be further connected to the PD, and the ADC is configured to convert an analog signal into a digital signal. In FIG. 9 and FIG. 10, a digital PD is used as an example for description.

Further, the plurality of transmission channels may further include a third transmission channel. The apparatus 200 is further configured to correct a deviation between the first transmission channel and the third transmission channel, and/or correct a deviation between the second transmission channel and the third transmission channel.

Herein, that the deviation between the first transmission channel and the third transmission channel is corrected is used as an example for description. The phase offset unit 201 is further configured to set a phase offset between the first transmission channel and the third transmission channel such that a phase deviation between the first transmission channel and the third transmission channel deviates from zero. The power detection unit 202 is further configured to detect signal powers between the first transmission channel and the third transmission channel under the phase offset. The detected signal powers include one or more signal power sets, and each signal power set includes a fourth signal power detected on the first transmission channel, a fifth signal power detected on the third transmission channel, and a sixth signal power detected on the first transmission channel and the third transmission channel. The processing unit 203 is further configured to determine, based on the detected signal powers, a deviation correction value between the first transmission channel and the third transmission channel. The deviation correction value includes at least a phase correction value, and may optionally further include an amplitude correction value. The phase correction unit 204 is further configured to set the phase correction value between the first transmission channel and the third transmission channel.

It should be noted that a specific implementation in which the apparatus 200 is further configured to correct the deviation between the first transmission channel and the third transmission channel, and/or correct the deviation between the second transmission channel and the third transmission channel is similar to the foregoing specific implementation in which the deviation between the first transmission channel and the second transmission channel is corrected. For details, refer to the foregoing related descriptions of correcting the deviation between the first transmission channel and the second transmission channel. Details are not described herein again in this embodiment of this application.

For example, the plurality of transmission channels include the first transmission channel, the second transmission channel, and the third transmission channel, the phase offset unit 201 and the phase correction unit 204 reuse a plurality of phase shifters, and one reused phase shifter is disposed on each transmission channel. A part of the structure of the apparatus is described using the example.

In the following FIG. 11 and FIG. 12, an example in which the power detection unit 202 includes a plurality of PDs, and each PD is connected to a transmission channel using a coupler is used. The processing unit 202 is not shown in FIG. 11 and FIG. 12.

Figure 11:
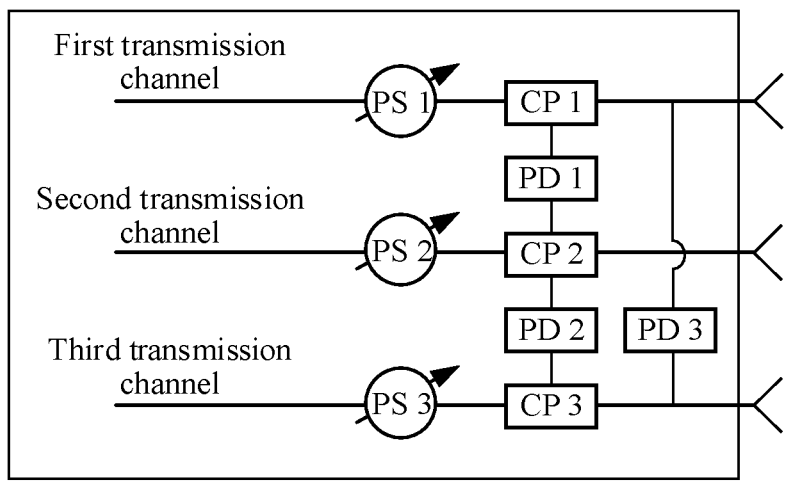
FIG. 11 is a schematic structural diagram of a part of a third apparatus according to an embodiment of this application.

As shown in FIG. 11, a phase shifter 1 is disposed on the first transmission channel, a phase shifter 2 is disposed on the second transmission channel, a phase shifter 3 is disposed on the third transmission channel, the first transmission channel and the second transmission channel are connected to a PD 1 using a coupler 1 and a coupler 2, the second transmission channel and the third transmission channel are connected to a PD 2 using the coupler 2 and a coupler 3, and the first transmission channel and the third transmission channel are connected to a PD 3 using the coupler 1 and the coupler 3. The PD 1 is configured to detect signal powers of the first transmission channel and the second transmission channel, the PD 2 is configured to detect signal powers of the second transmission channel and the third transmission channel, and the PD 3 is configured to detect signal powers of the first transmission channel and the third transmission channel.

Figure 12:
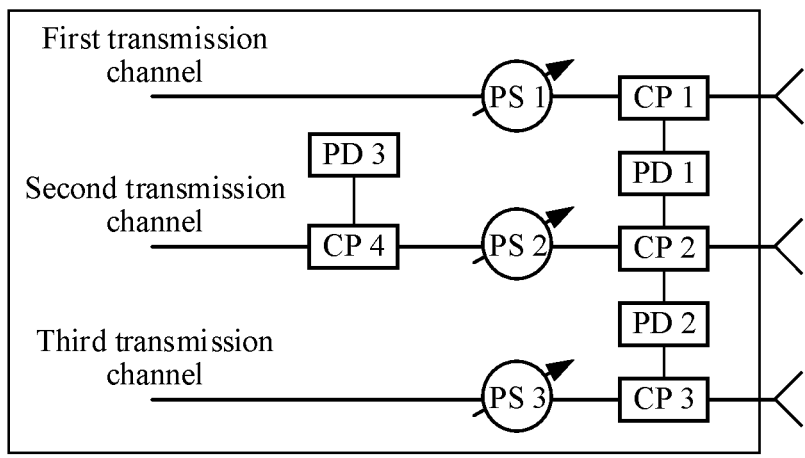
FIG. 12 is a schematic structural diagram of a part of a fourth apparatus according to an embodiment of this application.

Alternatively, as shown in FIG. 12, a phase shifter 1 is disposed on the first transmission channel, a phase shifter 2 is disposed on the second transmission channel, a phase shifter 3 is disposed on the third transmission channel, the first transmission channel and the second transmission channel are connected to a PD 1 using a coupler 1 and a coupler 2, the second transmission channel and the third transmission channel are connected to a PD 2 using the coupler 2 and a coupler 3, and the second transmission channel is further connected to a PD 3 using a coupler 4. The PD 1 is configured to detect signal powers of the first transmission channel and the second transmission channel, the PD 2 is configured to detect signal powers of the second transmission channel and the third transmission channel, and the PD 3 is configured to detect signal powers of the first transmission channel and the third transmission channel in an air interface loopback manner. In this case, that the second transmission channel is used as a receive channel is used as an example.

Further, when the apparatus 200 is further configured to correct a deviation between the first transmission channel and the third transmission channel, a deviation correction value between the first transmission channel and the third transmission channel may be obtained. When the apparatus 200 is further configured to correct a deviation between the second transmission channel and the third transmission channel, a deviation correction value between the second transmission channel and the third transmission channel may be obtained. Therefore, the processing unit 203 in the apparatus 200 may further determine an absolute deviation correction value of each transmission channel based on the deviation correction value between the first transmission channel and the second transmission channel, the deviation correction value between the second transmission channel and the third transmission channel, and the deviation correction value between the first transmission channel and the third transmission channel. The absolute deviation value may include an absolute phase correction value and an absolute amplitude correction value. Further, the phase correction unit 204 may perform correction based on the absolute deviation correction value of each transmission channel, to ensure consistency between the plurality of transmission channels.

In other words, when a quantity of transmission channels included in the plurality of transmission channels is greater than or equal to three, the plurality of transmission channels may be divided into a plurality of groups, each group includes two transmission channels, and a connection relationship between the two transmission channels may be shown in FIG. 11 or FIG. 12. The two transmission channels in a same group may determine a deviation correction value between the two transmission channels in the same group in a manner similar to the manner of correcting the deviation between the first transmission channel and the second transmission channel. Further, the absolute deviation correction value of each transmission channel is determined based on deviation correction values corresponding to the plurality of groups of transmission channels, and correction is performed based on the absolute deviation correction value of each transmission channel, to ensure consistency between the plurality of transmission channels.

For example, the plurality of transmission channels include four transmission channels, and are respectively a channel 1 to a channel 4. It is assumed that the four transmission channels may be divided into four groups the channel 1 and the channel 2, the channel 2 and the channel 3, the channel 3 and the channel 4, and the channel 4 and the channel 1. If four phase deviation correction values correspondingly determined by the processing unit 203 are sequentially $\theta_1$, $\theta_2$, $\theta_3$, and $\theta_4$, and absolute phase correction values of the four transmission channels are sequentially $\alpha_1$, $\alpha_2$, $\alpha_3$, and $\alpha_4$, the four phase deviation correction values (namely, $\theta_1$, $\theta_2$, $\theta^3$, and $\theta_4$) and the absolute phase correction values (namely, $\alpha_1$, $\alpha_2$, $\alpha_3$, and $\alpha_4$) meet the following formula (3)

$$\begin{cases} \alpha_2 - \alpha_1 = \theta_1 \\ \alpha_3 - \alpha_2 = \theta_2 \\ \alpha_4 - \alpha_3 = \theta_3 \\ \alpha_1 - \alpha_4 = \theta_4 \end{cases} \quad (3)$$

where the foregoing formula (3) may be described using a matrix D $\alpha=\theta$, and each matrix is shown as follows $$\theta = \begin{bmatrix} \theta_1 \\ \theta_2 \\ \theta_3 \\ \theta_4 \end{bmatrix}, a = \begin{bmatrix} \alpha_1 \\ \alpha_2 \\ \alpha_3 \\ \alpha_4 \end{bmatrix}, D = \begin{bmatrix} -1 & 1 & 0 & 0 \\ 0 & -1 & 1 & 0 \\ 0 & 0 & -1 & 1 \\ 1 & 0 & 0 & -1 \end{bmatrix}.$$

If it is assumed that the first transmission channel is a reference channel, in other words, when $\alpha_1=0$, the processing unit 203 is further configured to calculate absolute phase correction values of the second transmission channel, the third transmission channel, and the fourth transmission channel based on $\alpha_{i>1}=C^{-1}\theta$. $\alpha_{i>1}$ and $C^{-1}$ are shown as follows $$a_{i>1} = \begin{bmatrix} \alpha_2 \\ \alpha_3 \\ \alpha_4 \end{bmatrix}, C = \begin{bmatrix} 1 & 0 & 0 \\ -1 & 1 & 0 \\ 0 & -1 & 1 \\ 0 & 0 & -1 \end{bmatrix}.$$

It should be noted that the processing unit 203 is further configured to determine an absolute amplitude correction value of each of the plurality of transmission channels. A specific determining manner is similar to the foregoing manner of determining the absolute phase correction value of each transmission channel. For details, refer to the foregoing descriptions. Details are not described herein in this embodiment of this application.

Figure 13:
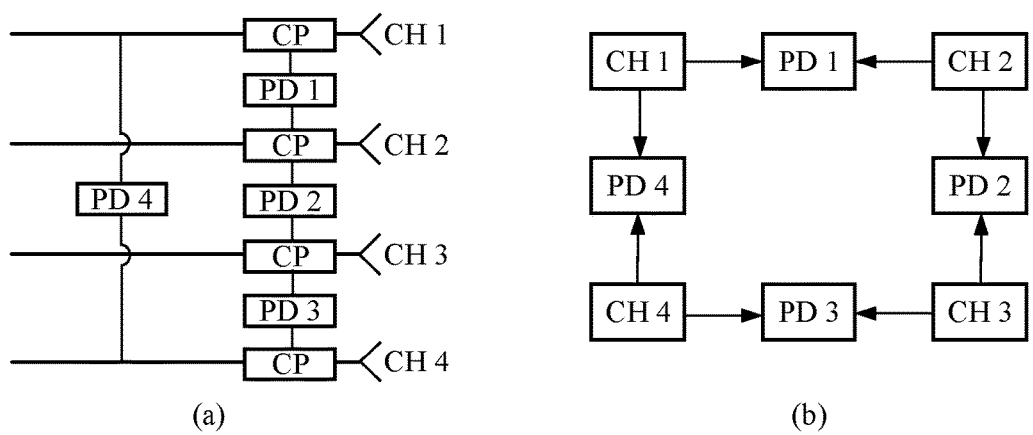
FIG. 13 is a schematic structural diagram of a part of a fifth apparatus according to an embodiment of this application.

For example, the power detection unit 202 may include a plurality of PDs, and a connection relationship between the plurality of PDs and the plurality of transmission channels may be in a plurality of different structures such as a ring structure, a grid structure, and the like. For example, FIG. 13 provides a schematic diagram of a linear structure. In FIG. 13, four transmission channels are used as an example for description. The four transmission channels may be represented as a channel 1 to a channel 4, and any two adjacent transmission channels are connected to each other using a PD (where a plurality of PDs may be represented as a PD 1 to a PD 4). The PD may be specifically coupled to an adjacent transmission channel using a coupler, and is configured to detect signal powers of the two connected transmission channels. (a) in FIG. 13 is a schematic diagram of a circuit structure, and (b) in FIG. 13 is a schematic diagram of an abstract connection relationship between transmission channels and PDs. Optionally, a connection relationship of the PD 4 used to detect the channel 1 and the channel 4 may also be consistent with the connection relationship of the PD used to detect the first transmission channel and the third transmission channel shown in FIG. 12. In an embodiment, an intermediate transmission channel in the plurality of transmission channels is selected, where a distance from the intermediate transmission channel to the channel 1 and a distance from the intermediate transmission channel to the channel 4 are equal or almost equal, a coupler is coupled to the selected transmission channel, and detection is performed in an air interface loopback manner.

Figure 14:
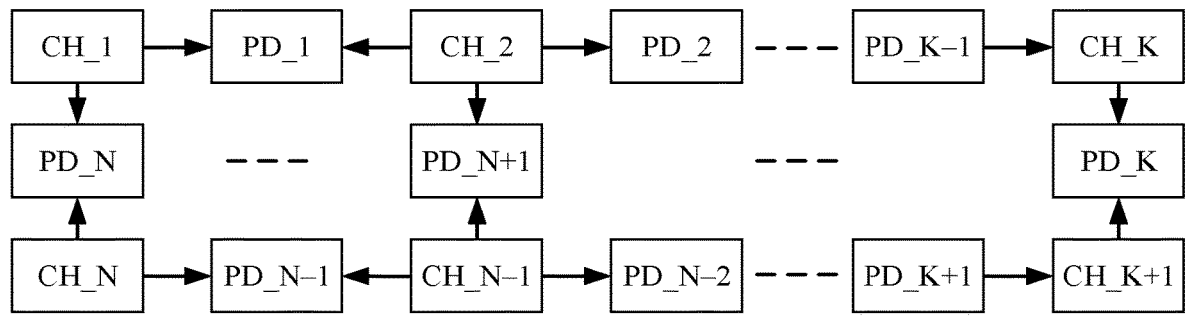
FIG. 14 is a schematic structural diagram of a part of a sixth apparatus according to an embodiment of this application.

FIG. 14 is a schematic diagram of a grid structure connection relationship between a plurality of transmission channels and PDs. The grid structure connection relationship may be a combination of a plurality of ring structures, and a quantity of transmission channels included in each ring structure may be the same or may be different. In FIG. 14, N transmission channels and N PDs are used as an example for description. In this embodiment of this application, only FIG. 14 is used as an example for description. FIG. 14 does not constitute a limitation on this embodiment of this application.

Figure 15:
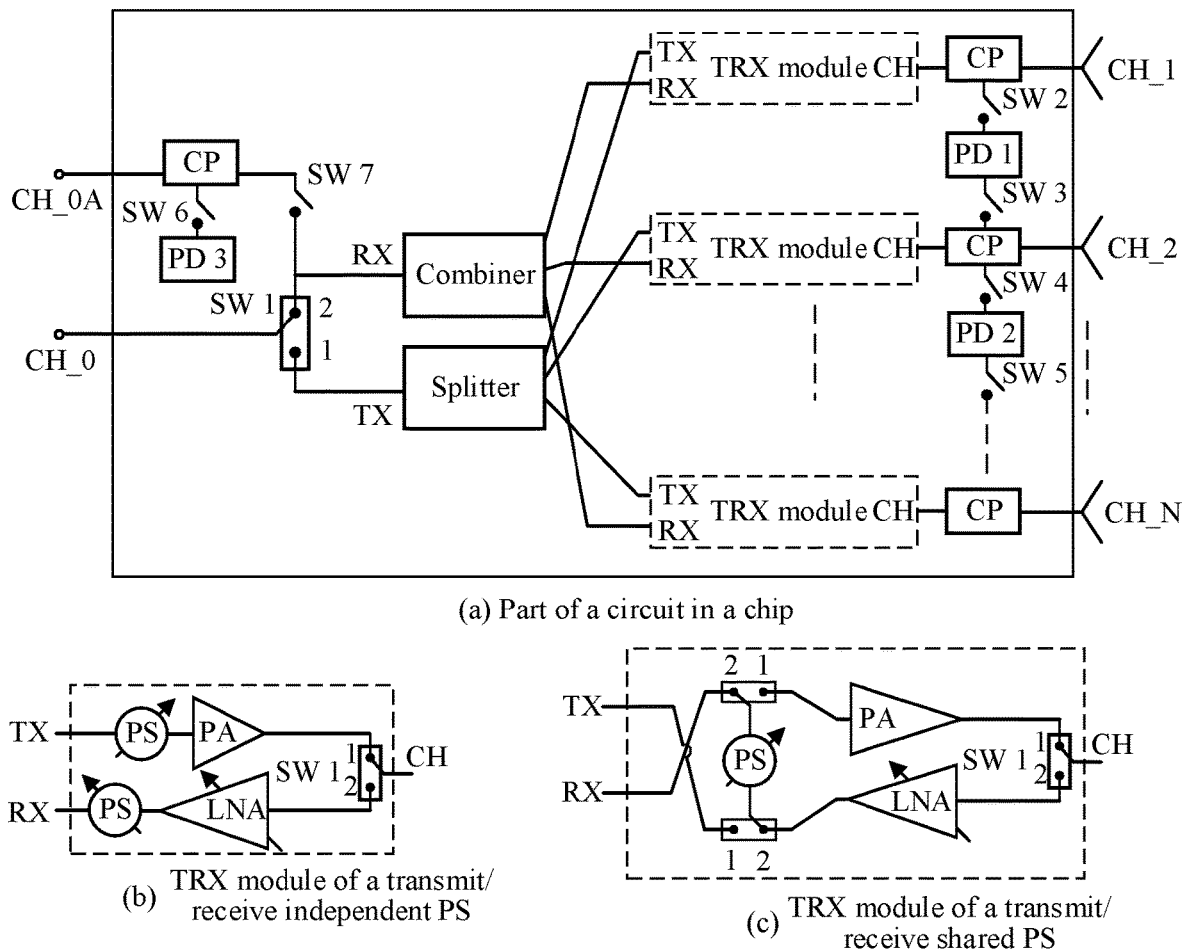
FIG. 15 is a schematic structural diagram of a part of a seventh apparatus according to an embodiment of this application.

In an embodiment, the plurality of transmission channels may be a plurality of transmission channels in one chip, the power detection unit 202 may include a plurality of PDs, and the phase offset unit 201 and the phase correction unit 204 may reuse a plurality of phase shifters. For example, a schematic diagram of a part of a circuit structure of the chip may be shown in (a) in FIG. 15. FIG. 15 does not show the phase offset unit 201, the processing unit 203, and the phase correction unit 204.

In FIG. 15 includes a switch (SW) and a transceiver (TRX) module is configured to switch a receive/transmit state of a transmission channel, each transmission channel is coupled to a PD (for example, a PD 1 to a PD 3) using a coupler, and an SW (for example, an SW 2 to an SW 7) is disposed between the coupler and the PD. FIG. 15 includes a plurality of SWs (which are an SW 1 to the SW 7, and there are a plurality of SWs 1). The plurality of SWs 1 are configured to switch transmit/receive states of a plurality of transmission channels in the chip (where optionally, the SW 1 may separately control a status of each transmission channel based on a correction requirement). When the plurality of SWs 1 are located at a position 1, the chip is in the transmit (TX) state. When the plurality of SWs 1 are in a position 2, the chip is in the receive (RX) state. When the SW 7 is closed, the PD 3 may be configured to detect a signal power of a receive channel in an air interface loopback manner. CH_0A may be a receive channel of the chip, and CH_0 may be an input channel of the chip.

As shown in (b) in FIG. 15, the TRX module may be a TRX module of a transmit/receive independent phase shifter. In an embodiment, when a transmission channel is used as a transmit channel or a receive channel, different phase shifters are used to implement a phase offset function and a phase correction function. Alternatively, as shown in (c) in FIG. 15, the TRX module is a TRX module of a transmit/receive shared phase shifter. In an embodiment, when a transmission channel is used as a transmit channel or a receive channel, a same phase shifter is used to implement a phase offset function and a phase correction function. In the TRX module, a power amplifier represents a power amplifier, and an LNA represents a LNA.

Figure 16:
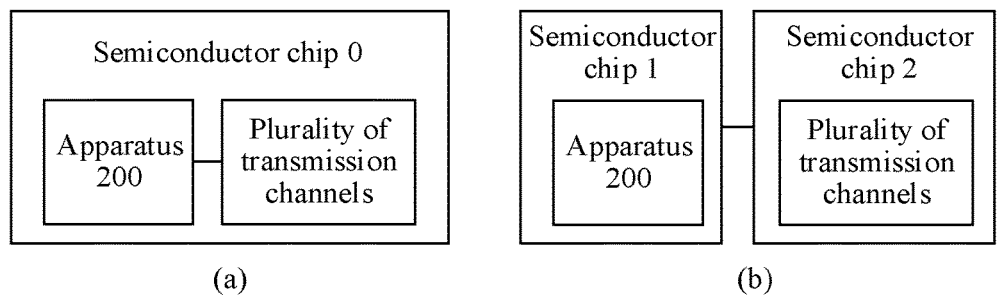
FIG. 16 is a schematic structural diagram of a semiconductor chip according to an embodiment of this application.

Further, as shown in FIG. 16, the apparatus 200 may be integrated into a semiconductor chip, and the plurality of transmission channels may also be integrated into a semiconductor chip. The apparatus 200 and the plurality of transmission channels may be integrated into a same semiconductor chip, or may be integrated into different semiconductor chips. In FIG. 16, (a) is a schematic diagram in which the apparatus 200 and the plurality of transmission channels are integrated into a semiconductor chip 0. In FIG. 16, (b) is a schematic diagram in which the apparatus 200 is integrated into a semiconductor chip 1, and the plurality of transmission channels are integrated into a semiconductor chip 2.

Further, the apparatus 200 may alternatively be integrated into a wireless channel device. For example, the wireless channel device may be a base station, or may be a terminal. When the wireless channel device is a base station, a semiconductor chip into which the plurality of to-be-corrected transmission channels are integrated may be located outside the wireless channel device. When the wireless channel device is a terminal, the apparatus 200 and the plurality of transmission channels may be integrated into the terminal, and may be integrated into a same semiconductor chip, or may be integrated into different semiconductor chips.

Figure 17:
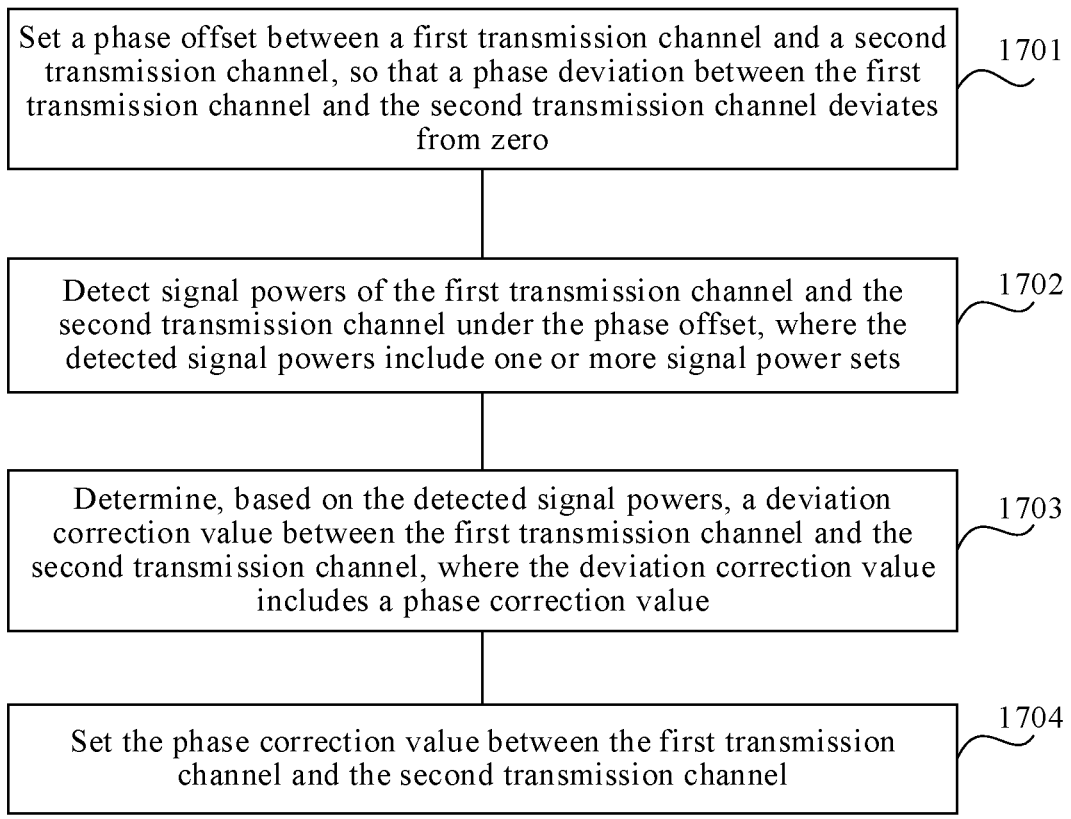
FIG. 17 is a schematic flowchart of a method for correcting a deviation between a plurality of transmission channels according to an embodiment of this application.

FIG. 17 is a schematic flowchart of a method for correcting a deviation between a plurality of transmission channels according to an embodiment of this application. The plurality of transmission channels include a first transmission channel and a second transmission channel. The method may be performed by an apparatus provided in the foregoing embodiments, or a chip integrating the apparatus, or a wireless communications device including the apparatus. Referring to FIG. 17, the method includes the following several steps.

Step 1701. Set a phase offset between the first transmission channel and the second transmission channel such that a phase deviation between the first transmission channel and the second transmission channel deviates from zero.

Step 1702. Detect signal powers of the first transmission channel and the second transmission channel under the phase offset.

The detected signal powers include one or more signal power sets, and each signal power set includes a first signal power detected on the first transmission channel, a second signal power detected on the second transmission channel, and a third signal power detected on the first transmission channel and the second transmission channel.

In addition, the phase offset may include a plurality of different preset phase offset values, the detected signal powers include a plurality of signal power sets, and each preset phase offset value corresponds to one signal power set. Each time a phase offset between the first transmission channel and the second transmission channel is set in step 1701, signal powers of the first transmission channel and the second transmission channel under the currently set phase offset are detected once in step 1702 such that by setting the different preset phase offset values for a plurality of times, the plurality of signal power sets may be obtained through detection.

Step 1703. Determine, based on the detected signal powers, a deviation correction value between the first transmission channel and the second transmission channel, where the deviation correction value includes a phase correction value.

Step 1704. Set the phase correction value between the first transmission channel and the second transmission channel.

Optionally, the deviation correction value may further include an amplitude correction value, and the method further includes setting the amplitude correction value between the first transmission channel and the second transmission channel.

It should be noted that, for a specific implementation process of step 1701 to step 1704, refer to related descriptions of the phase offset unit 201, the power detection unit 202, the processing unit 203, and the phase correction unit 204 in the apparatus embodiments in FIG. 2 to FIG. 10. Details are not described herein again in this embodiment of this application.

Further, when the plurality of transmission channels further include a third transmission channel, the method further includes correcting a deviation between the first transmission channel and the third transmission channel, and/or correcting a deviation between the second transmission channel and the third transmission channel. A method for correcting the deviation between the first transmission channel and the third transmission channel and correcting the deviation between the second transmission channel and the third transmission channel are consistent with the foregoing method for correcting a deviation between the first transmission channel and the second transmission channel. Details are not described herein again in this embodiment of this application.

In this embodiment of this application, the phase offset between the first transmission channel and the second transmission channel is set such that the phase deviation between the first transmission channel and the second transmission channel deviates from zero. Therefore, when the signal powers of the first transmission channel and the second transmission channel are detected, detection precision of the signal powers can be improved, and when the deviation correction value is determined based on the signal powers and phase deviation correction and amplitude deviation correction are performed, measurement errors of the phase correction value and the amplitude correction value can be reduced, and accuracy of channel correction is improved.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An apparatus for correcting a deviation between a plurality of transmission channels, wherein the transmission channels comprise a first transmission channel and a second transmission channel, wherein the apparatus comprises:
a phase offset system configured to set a phase offset between the first transmission channel and the second transmission channel such that a phase deviation between the first transmission channel and the second transmission channel deviates from zero;
a power detector coupled to the phase offset system and configured to detect signal powers of the first transmission channel and the second transmission channel under the phase offset, wherein the signal powers comprise one or more signal power sets, wherein each of the signal power sets comprises a first signal power from the first transmission channel, a second signal power from the second transmission channel, and a third signal power from the first transmission channel and the second transmission channel;
a processor coupled to the power detector and configured to determine a deviation correction value between the first transmission channel and the second transmission channel based on the first signal power, the second signal power, and the third signal power, wherein the deviation correction value comprises a phase correction value; and
a phase corrector coupled to the processor and configured to set the phase correction value between the first transmission channel and the second transmission channel.

2. The apparatus of claim 1, wherein the phase offset comprises a plurality of different preset phase offset values, wherein the first signal power and the second signal power comprise a plurality of signal power sets, and wherein each of the different preset phase offset values corresponds to one of the plurality of signal power sets.

3. The apparatus of claim 1, wherein the phase offset system and the phase corrector comprise a common phase shifter, and wherein the common phase shifter is disposed on each of the first transmission channel and the second transmission channel.

4. The apparatus of claim 1, wherein the phase offset system and the phase corrector are not disposed on the first transmission channel, and wherein the phase offset system and the phase corrector are disposed on the second transmission channel.

5. The apparatus of claim 1, wherein both the first transmission channel and the second transmission channel are transmit channels, and wherein the power detector is coupled to the first transmission channel with a first coupler and coupled to the second transmission channel using a second coupler to receive a signal from the first transmission channel.

6. The apparatus of claim 1, wherein both the first transmission channel and the second transmission channel are receive channels, wherein the apparatus further comprises a combiner coupled to the power detector by a coupler and configured to combine the first transmission channel and the second transmission channel.

7. The apparatus of claim 1, wherein both the first transmission channel and the second transmission channel are transmit channels, wherein the apparatus further comprises a receive channel coupled to the power detector with a coupler and an air interface coupled to the first transmission channel and the second transmission channel and configured to loop signals transmitted by the first transmission channel and the second transmission channel back to the receive channel.

8. The apparatus of claim 1, wherein the deviation correction value further comprises an amplitude correction value, and wherein the phase corrector is further configured to set the amplitude correction value between the first transmission channel and the second transmission channel.

9. The apparatus of claim 1, wherein the plurality of transmission channels further comprise a third transmission channel, wherein the apparatus is further configured to correct a deviation between the first transmission channel and the third transmission channel.

10. The apparatus of claim 1, wherein the apparatus and the plurality of transmission channels are disposed onto a same semiconductor chip.

11. The apparatus of claim 1, wherein both the first transmission channel and the second transmission channel are transmit channels, and wherein the power detector is coupled to the first transmission channel with a first coupler and coupled to the second transmission channel using the second transmission channel to receive a signal from the first transmission channel.

12. The apparatus of claim 1, wherein the plurality of transmission channels further comprise a third transmission channel, and wherein the apparatus is configured to correct a deviation between the second transmission channel and the third transmission channel.

13. The apparatus of claim 1, wherein the phase offset is an offset value, wherein the processor is further configured to:
set angle offset values of the first transmission channel for a first plurality of times using a first common phase shifter on the first transmission channel; and
set angle offset values of the second transmission channel for a second plurality of times using a second common phase shifter on the second transmission channel, wherein the offset value remains unchanged.

14. A wireless communications device, comprising:
a plurality of transmission channels comprising a first transmission channel and a second transmission channel;
an apparatus for correcting a deviation between the plurality of transmission channels coupled to the plurality of transmission channels, wherein the apparatus comprises:
a phase offset system configured to set a phase offset between the first transmission channel and the second transmission channel such that a phase deviation between the first transmission channel and the second transmission channel deviates from zero;
a power detector coupled to the power offset system and configured to detect signal powers of the first transmission channel and the second transmission channel under the phase offset, wherein the detected signal powers comprise one or more signal power sets, wherein each of the signal power sets comprises a first signal power from the first transmission channel, a second signal power from the second transmission channel, and a third signal power from the first transmission channel and the second transmission channel;
a processor coupled to the power detector and configured to determine a deviation correction value between the first transmission channel and the second transmission channel based on the first signal power, the second signal power, and the third signal power, wherein the deviation correction value comprises a phase correction value; and
a phase corrector coupled to the processor and configured to set the phase correction value between the first transmission channel and the second transmission channel.

15. The wireless communication device of claim 14, wherein the phase offset is an offset value, wherein the processor is further configured to:
set angle offset values of the first transmission channel for a first plurality of times using a first common phase shifter on the first transmission channel; and
set angle offset values of the second transmission channel for a second plurality of times using a second common phase shifter on the second transmission channel, wherein the offset value remains unchanged.

16. A method for correcting a deviation between a plurality of transmission channels, wherein the plurality of transmission channels comprise a first transmission channel and a second transmission channel, wherein the method comprises:
setting a phase offset between the first transmission channel and the second transmission channel such that a phase deviation between the first transmission channel and the second transmission channel deviates from zero;
detecting signal powers of the first transmission channel and the second transmission channel under the phase offset, wherein the detected signal powers comprise one or more signal power sets, wherein each of the signal power sets comprises a first signal power from the first transmission channel, a second signal power from the second transmission channel, and a third signal power from the first transmission channel and the second transmission channel;
determining a deviation correction value between the first transmission channel and the second transmission channel based on the first signal power, the second signal power, and the third signal power, wherein the deviation correction value comprises a phase correction value; and setting the phase correction value between the first transmission channel and the second transmission channel.

17. The method of claim 16, wherein the phase offset comprises a plurality of different preset phase offset values, wherein the first signal power and the second signal power comprise a plurality of signal power sets, and wherein each of the different preset phase offset values correspond to one of the plurality of signal power sets.

18. The method of claim 16, wherein the deviation correction value further comprises an amplitude correction value, and wherein the method further comprises setting the amplitude correction value between the first transmission channel and the second transmission channel.

19. The method of claim 16, wherein the plurality of transmission channels further comprises a third transmission channel, wherein the method further comprises correcting a deviation between the first transmission channel and the third transmission channel.

20. The method of claim 16, wherein the plurality of transmission channels further comprises a third transmission channel, and wherein the method further comprises correcting a deviation between the second transmission channel and the third transmission channel.

\* \* \* \* \*